(12) United States Patent
Ericson (10) Patent No.: US 11,206,258 B2
(45) Date of Patent: Dec. 21, 2021

(54) IDENTITY CONFIRMATION DURING AUTHENTICATION REQUESTS USING NEARBY MOBILE COMPUTING DEVICES

(71) Applicant: PAYPAL, INC., San Jose, CA (US)

(72) Inventor: Braden Christopher Ericson, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 371 days.

(21) Appl. No.: 16/234,345

(22) Filed: Dec. 27, 2018

(65) Prior Publication Data

US 2020/0213298 A1 Jul. 2, 2020

(51) Int. Cl.
*H04L 29/06* (2006.01)
*H04W 12/06* (2021.01)
*H04W 12/47* (2021.01)

(52) U.S. Cl.
CPC ........ *H04L 63/0853* (2013.01); *H04L 63/107* (2013.01); *H04W 12/06* (2013.01); *H04W 12/47* (2021.01)

(58) Field of Classification Search
CPC . H04L 63/08; H04L 63/0838; H04L 63/0853; H04L 63/0861; H04L 63/107; H04L 63/18; G06F 21/31; G06F 21/32; G06F 21/34; G06F 21/35; G06F 21/6245; H04W 12/06; H04W 12/47
See application file for complete search history.

(56) References Cited

U.S. PATENT DOCUMENTS

| | | | |
|---|---|---|---|
| 9,166,961 B1* | 10/2015 | Johansson | H04L 63/08 |
| 2016/0269403 A1* | 9/2016 | Koutenaei | H04L 63/107 |
| 2018/0181737 A1* | 6/2018 | Tussy | G06F 21/32 |
| 2018/0181964 A1* | 6/2018 | Zagarese | G06Q 20/40145 |
| 2019/0197815 A1* | 6/2019 | Kamal | G06Q 20/40145 |
| 2020/0120094 A1* | 4/2020 | Jain | H04L 63/107 |

* cited by examiner

*Primary Examiner* — Robert B Leung
*Assistant Examiner* — Sangseok Park
(74) *Attorney, Agent, or Firm* — Haynes and Boone, LLP (57) ABSTRACT

There are provided systems and methods for identity confirmation during authentication requests using nearby devices. A device and/or service provider may detect an authentication request, including one for device process or a service provider interaction. In response to the request, the device may scan for nearby devices over short range wireless communications and identify one or more devices that are close to the device. An identity confirmation request may be generated, which may include a picture of a user that should be performing the authentication, such as a user owning the device or account that is being accessed. The request may be transmitted to the nearby devices to require that users of the nearby devices can identify that user and utilizing the device to process the authentication request. This may include using facial recognition to image the user by the other devices.

20 Claims, 5 Drawing Sheets

IDENTITY CONFIRMATION DURING AUTHENTICATION REQUESTS USING NEARBY MOBILE COMPUTING DEVICES

TECHNICAL FIELD

The present application generally relates to authentication through mobile computing devices, and more specifically to using short range wireless communications to confirm user identity during device authentication processing through mobile computing devices.

BACKGROUND

Users may utilize various computing devices, such as tablet computers, mobile smart phones, and wearable computing devices, to perform computing functions while the user is mobile. For example, users may wish to perform payment processes using mobile devices, which may include electronic transaction processing for purchase with merchants and/or transfers to other users. However, computing devices, and especially mobile devices may be susceptible to fraudulent use and access by unauthorized users. Service providers may institute various types of authentication mechanisms to reduce fraud, but bad actors may still be capable of determining authentication credentials and accessing account or sensitive data, including through remote login actions. This is due to the remote nature of an online service provider from the location of requested authentication and access request by a device, where the service provider is not able to confirm an identity of the user. Thus, service providers may run an increased risk of fraud and loss due to malicious actions that may circumvent authentication mechanisms and precautions with mobile computing devices.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for identity confirmation during authentication requests using nearby computing devices. Systems suitable for practicing methods of the present disclosure are also provided.

A computing device and/or service provider may receive an access and/or authentication request, where a user's identity, authentication credentials, and/or other information may be required to be confirmed before the user is authenticated and provided access to an electronic account or content. For example, a user may attempt to access or login to an account with an online service provider, such as an email, messaging, social networking, and/or payment and transaction processing account. The user may also wish to perform an action with the online service provider, including paying for a transaction using a payment account with the service provider, viewing sensitive information, or changing account credentials. The device may be utilized by a user to perform various electronic transaction processing processes, including shopping, purchase, user transfers, and other user or merchant transactions. The communication device may therefore include one or more software processes to perform the aforementioned actions, which may be included with one or more applications executing on the communication device. The service provider may require completing an authentication mechanism to provide the requested access. In other embodiments, the device may have an authentication mechanism to provide access and/or use of the device, such as an unlocking mechanism to unlock and use the device, an application opening or usage authentication requirement, and/or an authentication mechanism to make changes to device parameters, information, or credentials (e.g., a password change). The device may also provide access to a physical location, such as an electronic lock of a door, location, safe, or vehicle.

In response to the requested access, the device or service provider may output an authentication request that requires the user to enter in credentials (e.g., a username, password, and/or personal identification number (PIN)). The device or service provider may determine that identity confirmation of the user using the device needs to be performed, where the identity confirmation is to confirm that the user using the device is the user that is associated with the requested access, such as the account, the owner of the device, or a valid other user that has access to the account, device, or resource. The identity confirmation requirement may be to confirm user identification as using the device to respond to the authentication request and challenge, and therefore is the user that is validly requesting the access and may be provided to access without risking virtual fraud, theft, or misappropriation through the device. In some embodiments, the identity confirmation may be required where the device is attempting use or login with the service provider or to the device in a new or foreign location, at an unusual time, or in an unusual set of events or circumstances. However, in other embodiments, the device/service provider may provide increased security through instituting the identity confirmation for all logins or access requests or the owner of the device/account may require the identity confirmation to provide the increased security.

In order to confirm an identity of the user using the device to respond to the authentication request, the device and/or service provider may determine other nearby devices to the device. In some embodiments, a first device processing the authentication request may perform a short range wireless scan of nearby devices, for example through Bluetooth, Bluetooth Low Energy (BLE), Long-Term Evolution (LTE) Direct, near field communications (NFC), or other short range wireless protocol that allows for device-to-device communications and identification of nearby devices. For example, the first device may ping for nearby devices that may respond with identification of the nearby devices, or may emit an identifier that causes the nearby devices to communicate with the first device. In some embodiments, the first device and/or the service provider may identify the nearby devices by determining a geo-location of the first device and performing geo-location matching with other devices within a proximity to the first device's geo-location, such as within a geo-fence established around or nearby the first device's geo-location, where the geo-fence may change based on various factors such as density of other user computing devices in the area, e.g., a denser concentration may result in a smaller geo-fence. The first device and/or the service provider may identify at least one other nearby device, such as a second device, to request the identity confirmation of the user using the first device.

In some embodiments, the second device(s) may be selected based on one or more parameters. In some embodiments, the first device and/or service provider may select the second device(s) based on a closest detected device, such as closest geo-locations or nearby devices detected as the closest through triangulation or received signal strength indicator (RSSI) measurements with the devices communicating over short range wireless communications. These devices may be selected to provide a best unimpeded view of the user using the first device for identity confirmation. In other embodiments, the device or service provider may select the second device(s) based on known contacts and/or social connects (e.g., through a social network platform, messaging, contact list, device interactions, transaction histories, etc.) of the user associated with the first device, account, or other resource being accessed through the authentication request. The second device may also be selected based on an account with the service provider, for example, if the devices share an account or interact between two or more accounts. The first device and/or service provider may also select a plurality of devices to provide additional security in the identity confirmation and thereby provide better authentication mechanisms to prevent fraud.

The first device or service provider may generate a message having an identity confirmation request for transmission to the selected nearby device(s) once identified. The message may include an image of the first user or other identifying characteristics of the user that is the owner or valid associated user of the device/account/resource, such as a description of appearance, dress, or known items in possession of the user. Other information may also be provided, such as a name, license plate of a vehicle for the user, or other identifier that may be used to visually and/or through speech identify the user and confirm the identity of the user using the first device as the correct party. In some embodiments where the device or account may be shared by multiple users, multiple images or user identifying descriptions may be provided. The message may also include a request to confirm the user's identity, such as a message that states "Do you see [this user] within your vicinity?" or "Please confirm you can see [this user]." The message may include a responsive interface element to provide confirmation of denial of the presence of the user, or the message may be returned with a message or comments that confirm or deny the presence (e.g., a text message back that states "Yes" or "No"). The message may be formatted as a text message, push notification for an application, banner message, or other message that may be displayable on the selected second device(s).

In some embodiments, the message may include further requests. For example, the message may request that one or more other users for the second device(s) capture an image of the user using the first device and transmit that image back to the device or service provider. Thus, the image may include a process to access a camera and capture an image of the user, which may include a camera viewfinder interface. The message may also request that the other user(s) point the second device(s) at the user using the first device if identified. This may assist in triangulation of a position of the first device and location matching of the triangulated position of the first device to a known geo-location of the first device. Thus, the message may also or instead include a process to access compass, mapping, accelerometers, gyroscopes, or other movement detection sensors on the second device(s) to assist in capturing data for triangulation. The message may then be sent to the second device(s) through short range wireless communications, for example, by pushing the message from the first device to the second device(s), or may be sent over network connections with the second device by the service provider.

The first device and/or the service provider may receive a response over the short range wireless communications or network connection(s) with the second device(s). The first device or service provider may then perform identity confirmation using the response. Where an identification request requires only an affirmative response or other reply (e.g., "Yes" or "No" to whether the user can be seen), the first device or service provider may confirm the identity using the responsive data, text, or selection. However, where an image is provided with the response, image matching, facial recognition, or other image processing may be used to determine whether the correct user is recognized as using the first device. In some embodiments, triangulation data may be received where multiple second devices are pointed towards the user when requested to identify the user. Such data may also be captured when the second devices capture images of the user. The first device or service provider may utilize signal and/or location triangulation to determine a location that the second devices are pointing, and may determine whether the triangulated position matches the geo-location of the first device detected using a location detection component and/or short range wireless communications of the first device.

In some embodiments, a score may be calculated to determine whether the user's identity can be confirmed, such as if enough of the detected data is sufficient to meet a threshold score or value to proceed with authentication of the user on the first device. For example, in order to proceed with electronic transaction processing, the service provider may calculate a risk in proceeding with the transaction based on the identity data detected of the user using the first device. The risk assessment or level may be determined for how risky the transaction is to complete based on the identity data. Thus, the risk level may indicate the potential fraud in the transaction and whether there is fraud or risk of loss in proceeding with the transaction by authenticating the user using the first device. Risk factors for the risk assessment or risk level may include amount of funds in the account for use in completing the transaction (e.g., if there are sufficient funds), a number of reversed or fraudulent past transactions including those during device failure, a length of account ownership or since opening, available payment instruments for the account, a number or amount of transactions, an amount of the transaction, a comparison of the amount to past transactions, a location of the transaction, a time of the transaction, participants in the transaction and whether there are past connections or transactions between the participants (e.g., if the user of the failed device and the target of the transaction are friends or family and known each other), or other factor that may indicate potential risk. If there is an unacceptable level of risk, such as if the risk level exceeds a threshold level or number, then the service provider may not proceed with the authentication of the user and may mark the transaction as failed. One or more other nearby devices may then be requested to confirm the identity of the user to proceed with the authentication and transaction, and the user's identity may be retested. In some embodiments, the device and/or user using the device may be flagged for potential fraud and locked out of the device, account, or other resource if the identity cannot be verified.

If there the user can be accurately identified, the device and/or service provider may confirm the identity of the user and proceed with authentication if the authentication credentials are correct. Thus, if there is no risk in the authentication or the risk is at an acceptable level (e.g., below a threshold amount), the user may be permitted the requested access and/or perform the process requested by the user (e.g., electronic transaction processing). Additionally, if the identity may be confirmed, then the parameter or data that enabled the identity confirmation (e.g., the new location or unusual time request) may be added to stored data so that identity confirmation may not be required in the future for similar situations. The user may also be associated with the device for a time period so that the user may perform additional actions without requiring identity confirmation and/or authentication.

As previously discussed, the online service provider may provide account services to users of the online service provider, as well as other entities requesting additional services, which may be used to process electronic transactions during device operation, as discussed herein. A user wishing to establish the account may first access the online service provider and request establishment of an account. The account may be established by providing account details, such as a login, password (or other authentication credential, such as a biometric fingerprint, retinal scan, etc.), and account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation. In order to create an account, the user may be required to select an account name and/or provide authentication credentials, such as a password, personal identification number (PIN), answers to security questions, and/or other authentication information. A token may be issued to the device of the user for their respective personal account, where the token may include data (which may be encrypted) allowing the service provider to identify the user and their account and authenticate the user. Additionally, the online payment provider or other service provider may provide digital wallet services, which may offer financial services to send, store, and receive money, process financial instruments, and/or provide transaction histories. The application or website of the service provider, such as PayPal® or other online payment provider, may provide payments and the other transaction processing services.

In this manner, a device and/or service provider may provide increased security for digital access requests, such as account usages, device processes, and/or data processing, by leveraging the short range wireless communication capabilities over the device to detect nearby devices. This helps prevent bad actors from compromising devices or accounts when utilizing stolen credentials. Thus, authentication mechanism may be made more robust to reduce digital fraud and misappropriation and increase security when utilizing devices for authentication with a remote device/server over a network.

Figure 1:
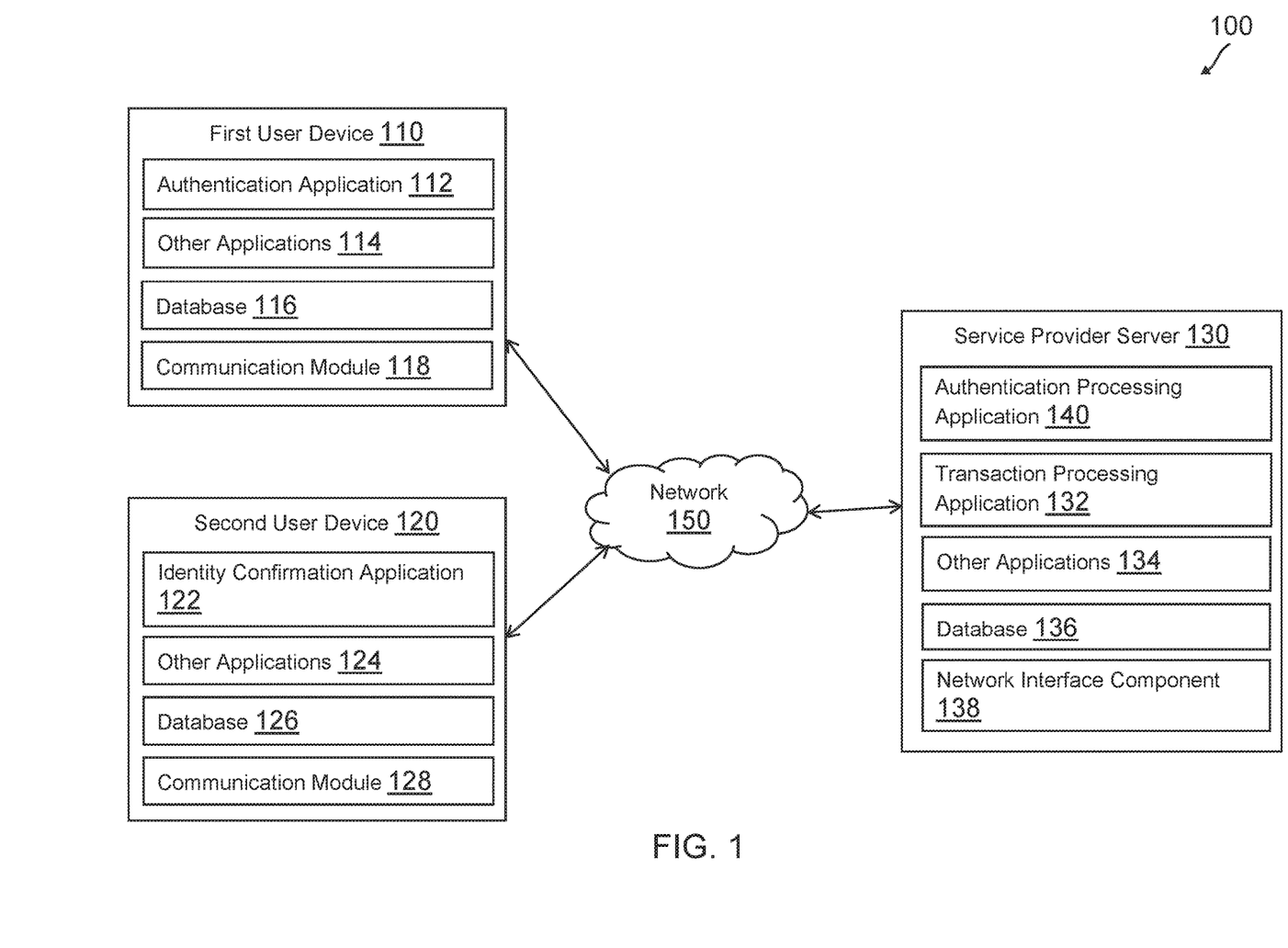
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first user device 110, a second user device 120, and a service provider server 130 in communication over a network 150. A first user (not shown) may utilize first user device 110 to request authentication, such as to access first user device 110 and/or a service provided by service provider server 130. First user device 110 and/or service provider server 130 may determine that the authentication request requires identity confirmation of the first user using first user device 110 being the authorized user for the authentication request. Second user device 120 may be identified as being within a proximity distance or range of first user device 110 so that a second user (not shown) may identify first user device 110. Second user device 120 may receive a request to identify the first user, and based on a response, the first user's identity may be confirmed or denied.

First user device 110, second user device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

First user device 110 may be implemented as a communication device that may utilize appropriate hardware and software configured for wired and/or wireless communication with second user device 120 and/or service provider server 130. For example, in one embodiment, first user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

First user device 110 of FIG. 1 contains an authentication application 112, other applications 114, a database 116, and a communication module 118. Authentication application 112 and other applications 114 may correspond to executable processes, procedures, and/or applications with associated hardware. In other embodiments, first user device 110 may include additional or different modules having specialized hardware and/or software as required.

Authentication application 112 may correspond to one or more processes to execute modules and associated devices of first user device 110 to receive an access request, which requires authentication of a user using first user device 110, and authenticate the user based on the user's identity being confirmed as a valid user using first user device 110 based on an identity confirmation request sent to second user device 120. In this regard, authentication application 112 may correspond to specialized hardware and/or software utilized by first user device 110 to first receive or generate an authentication request, for example, in response a request to access a virtual or real item, account, object, location, or another thing, such as unlocking first user device 110, executing a process on first user device 110, accessing an account or other resource with service provider server 130, and/or utilizing the account/resource. The access request may be generated through use of authentication application 112 or through another application of first user device 110, such one or more of other applications 114. In other embodiments, the access request may occur through a real-world interaction by the user, based on an access permission granted by another user, or through a request to use a service of service provider server 130. Authentication application 112 may correspond to a general browser application configured to retrieve, present, and communicate information over the Internet (e.g., utilize resources on the World Wide Web) or a private network. For example, authentication application 112 may provide a web browser, which may send and receive information over network 150, including retrieving website information, presenting the website information to the user, and/or communicating information to the website. However, in other embodiments, authentication application 112 may include a dedicated application of service provider server 130 or other entity (e.g., payment provider, etc.), which may be configured to provide services through the application.

Thus, authentication application 112 may receive input corresponding to the access request, which may include authentication credentials or other input that requests use of a process, account, or service. In response to the access request, authentication application 112 and/or service provider server 130 may determine that an identity of the user using first user device 110 may be required to be validated and confirmed as an authorized used for the access request. Authentication application 112 may perform a scan, such as through Bluetooth, Bluetooth Low Energy, radio, infrared, WiFi, near field communications, LTE Direct, or other short range communication protocol, to determine that second user device 110 is within range of first user device 110. Authentication application 112 may also display a list of eligible verification users within range to first user device 110 within an interface and allow the user to select one of the eligible verification users. This may be displayed based on prior authentications and/or verifications performed by the eligible verification users and/or connections between first user device 110 and/or the user with the eligible users. Thus, the user may select one of the devices, such as second user device 120, through the interface for the verification of the user's identity. In other embodiments, second user device 120 may be detected as being within proximity to first user device 110 using geo-locations and/or geo-fencing. In response to determining that second user device 120 is within proximity to first user device 110, an identity confirmation request may be transmitted to second user device 120, such as by first user device 110 using the short range wireless communication protocol. The request may correspond to a message having an image of the authorized user associated with the access request. The request may therefore ask a user using second user device 120 to determine whether they can identify the authorized user in proximity to them. If the user using second user device 120 affirmatively identifies the user, such as the user using first user device 110, then authentication application 112 may receive confirmation of the identity, and may provide the requested access to the device, process, account, and/or service. However, if the identity cannot be confirmed, authentication application 112 may deny the requested access.

Authentication application 112 may further include processes used to perform electronic transaction processing for a payment or a transfer. During processing of a payment or transfer transaction, authentication application 112 may be utilized to select payment instrument(s) for use in providing payment for a purchase transaction, transfer, or other financial process. As discussed herein, authentication application 112 may utilize user financial information, such as a credit card, bank account, or other financial account, as a payment instrument when providing payment information. Additionally, authentication application 112 may utilize a digital wallet stored with an account with a payment provider, such as service provider server 130, as the payment instrument, for example, through accessing a digital wallet or account of a user with service provider server 130 through entry of authentication credentials and/or by providing a data token that allows for processing using the account. Authentication application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant to authenticate the account, digital wallet, and/or payment instruments to service provider server 130 and allow for transaction processing and payment using the account, digital wallet, and/or payment instruments. Authentication application 112 may also receive transaction data elements, including a recipient (e.g., an identifier associated with second communication device 110) and a transaction amount. Authentication application 112 may be utilized to view the results of payment, for example, using transaction histories, dispute resolution processes, and other post-transaction process.

In various embodiments, first user device 110 includes other applications 114 as may be desired in particular embodiments to provide features to first user device 110. For example, other applications 114 may include security applications for implementing client-side security features, programmatic client applications for interfacing with appropriate application programming interfaces (APIs) over network 150, or other types of applications. Other applications 114 may also include additional communication applications, such as email, texting, voice, and IM applications that allow a user to send and receive emails, calls, texts, and other notifications through network 150. In various embodiments, other applications 114 may include financial applications, such as banking, online payments, money transfer, or other applications. Other applications 114 may also include other location detection applications, such as a mapping, compass, and/or GPS application, which may be used to determine a location for the user that is communicated to service provider server 130. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

First user device 110 may further include database 116 stored in a transitory and/or non-transitory memory of first user device 110, which may store various applications and data and be utilized during execution of various modules of first user device 110. Thus, database 116 may include, for example, identifiers (IDs) such as operating system registry entries, cookies associated with authentication application 112 and/or other applications 114, IDs associated with hardware of first user device 110, or other appropriate IDs, such as IDs used for payment/user/device authentication or identification. Database 116 may include an access request, entered authentication credentials (e.g., a username/password), a message that may be transmitted to second user device 120, and/or an identity confirmation result.

First user device 110 includes at least one communication module 118 adapted to communicate with second user device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Second user device 120 may be implemented as a communication device that may utilize appropriate hardware and software configured for wired and/or wireless communication with first user device 110 and/or service provider server 130. For example, in one embodiment, second user device 120 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second user device 120 of FIG. 1 contains an identity confirmation application 122, other applications 124, a database 126, and a communication module 138. Identity confirmation application 122 and other applications 124 may correspond to executable processes, procedures, and/or applications with associated hardware. In other embodiments, second user device 120 may include additional or different modules having specialized hardware and/or software as required.

Identity confirmation application 122 may correspond to one or more processes to execute modules and associated devices of second user device 120 to confirm an identity of a user using first user device 120 in response to an identity confirmation request. In this regard, identity confirmation application 122 may correspond to specialized hardware and/or software utilized by second user device 120 to first receive a short range wireless communication, such as a ping or device presence request, from first user device 110 that identifies second user device 120 as in proximity to first user device 110. In other embodiments, identity confirmation application 122 may provide a geo-location of second user device 120 that may be used to determine that second user device 120 is in proximity to first user device 110. After first user device 110 and/or service provider server 130 determine that second user device 120 is nearby to first user device 110, a message to confirm an identity of a user using first user device 110 may be transmitted to second user device 120 and processed by identity confirmation application 122.

The message may include an image of the user that is associated with the requested access on first user device 110, such as an owner or authorized user of first user device 110 and/or an account or service provided by service provider server 130. Identity confirmation application 122 may output the user image with a request to confirm that the user can be seen. The message may also request that a user using second user device 120 capture an image or video of the user shown in the message's image if that user can be identified and/or point second user device 120 in the direction of the user. In this regard, identity confirmation application 122 may be used to capture an image and/or device directional data (e.g., a line of sight, compass direction, etc.). Identity confirmation application 122 may receive input from the user and/or detected data by second user device 120 in response to the message, and may transmit the input and/or data to first user device 110 and/or service provider server 130 for processing to determine an identity of the user using first user device 110.

In various embodiments, second user device 120 includes other applications 124 as may be desired in particular embodiments to provide features to second user device 120. For example, other applications 124 may include security applications for implementing client-side security features, programmatic client applications for interfacing with appropriate application programming interfaces (APIs) over network 150, or other types of applications. Other applications 124 may also include additional communication applications, such as email, texting, voice and IM applications that allow a user to send and receive emails, calls, texts, and other notifications through network 150. Other applications 124 may also include other location detection applications, such as a mapping, compass, and/or GPS application, which may be used to determine a location for second user device 120. Other applications 124 may include device interfaces and other display modules that may receive input and/or output information. For example, other applications 124 may contain software programs, executable by a processor, including a graphical user interface (GUI) configured to provide an interface to the user.

Second user device 120 may further include database 126 stored in a transitory and/or non-transitory memory of second user device 120, which may store various applications and data and be utilized during execution of various modules of second user device 120. Thus, database 126 may include, for example, identifiers (IDs) such as operating system registry entries, cookies associated with identity confirmation application 122 and/or other applications 124, IDs associated with hardware of second user device 120, or other appropriate IDs, such as IDs used for payment/user/device authentication or identification. Database 126 may include a received identity confirmation message, as well as input (e.g., confirmation of the user's identity) and/or data captured in response to the message.

Second user device 120 includes at least one communication module 138 adapted to communicate with first user device 110 and/or service provider server 130. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide leased device services for the first user associated with first user device 110 and the second user associated with second user device 120. In this regard, service provider server 130 includes one or more processing applications which may be configured to interact with first user device 110, second user device 120, and/or another device/server to facilitate authenticating users and/or devices for use of one or more accounts and/or services provided by a service provider. In one example, service provider server 130 may be provided by PAYPAL®, Inc. of San Jose, Calif., USA. However, in other embodiments, service provider server 130 may be maintained by or include a financial service provider, social networking service, email or messaging service, media sharing service, and/or other service provider, which may provide authentication services requiring identity confirmation, for example, for the use of an account.

Service provider server 130 of FIG. 1 includes an authentication processing application 140, a transaction processing application 132, other applications 134, a database 136, and a network interface component 138. Authentication processing application 140, transaction processing application 132, and other applications 134 may correspond to executable processes, procedures, and/or applications with associated hardware. In other embodiments, service provider server 130 may include additional or different modules having specialized hardware and/or software as required.

Authentication processing application 140 may correspond to one or more processes to execute modules and associated specialized hardware of service provider server 130 to authenticate a user using first user device 110 in response to an access request, where the authentication occurs based on confirming the user's identity through a message transmitted to second user device 120. In this regard, authentication processing application 140 may correspond to specialized hardware and/or software to receive an access request, and in response to the access request, determine that the user using first user device 110 requires their identity to be confirmed as a valid or authorized user for giving access to a device, account, and/or service based on the request. Authentication processing application 140 may determine that the identity is required to be confirmed based on the parameters of the access request, such as the location, time, or transaction details (e.g., amount, items, etc.). In some embodiments, authentication processing application 140 may determine second user device 120 is in proximity to first user device 110 by requesting a scan of nearby devices through short range communications by first user device 110 and/or detecting geo-locations of first user device 110 and second user device 120. Thus, authentication processing application 140 may provide one or more of the processes discussed in reference to authentication application 112 on first user device 110, and vice versa.

In some embodiments, authentication processing application 140 may generate a message for second user device 120 to confirm the identity or presence of a valid user using first user device 110. The message may include an image of the user that may be taken from database 136 and/or data associated with an account of the user. The message may be pushed to second user device 120 through first user device 110, or may be transmitted to second user device 120 over network 150. In response to the message, authentication processing application 140 may receive identity confirmation or denial data from first user device 110 and/or second user device 120, which may include a response to whether the user using second user device 120 was capable of identifying the user in the message's image. The response data may further include an image, which may be processed using facial recognition to determine whether the user is identified. Additionally, location and/or directional data may be provided, which may be used with other directional data to perform location triangulation of the location of where the user in the image was identified. Authentication processing application 140 may determine whether that triangulated location matches a geo-location of first user device 110. If the user can be confirmed as utilizing first user device 110 during the authentication request, the user's identity may be confirmed and authentication processing application 140 may provide the requested access, service, and/or other process that required the authentication.

Transaction processing application 132 may correspond to one or more processes to execute modules and associated specialized hardware of service provider server 130 to process a transaction, where the transaction may include transaction data generated by first user device 110. In this regard, transaction processing application 132 may correspond to specialized hardware and/or software used by a user associated with first user device 110 to establish a payment account. In various embodiments, the financial information may include payment instrument information, such as account/card numbers and information. The account may be used to send and process payments, for example, by referring to stored financial information. The payment account may be accessed and/or used through a browser application and/or dedicated payment application executed by first user device 110 and engage in transaction processing through transaction processing application 132. The payment account may also be accessed through an authentication mechanism by first user device 110, which may require identity verification and confirmation through second user device 120. In some embodiments, first user device 110 and/or a merchant device may generate transaction data, and may communicate with transaction processing application 132 to process the transaction with the account. Transaction processing application 132 may process a payment using the financial information to an account of another user or a merchant. Transaction processing application 132 may process the payment, and may provide a transaction history to first user device 110 for transaction authorization, approval, or denial. Additionally, transaction processing application may apply any rewards and/or loyalty benefits available to the user to the transaction, where such benefits are not applied directly by first user device 110.

In various embodiments, service provider server 130 includes other applications 134 as may be desired in particular embodiments to provide features to payment provider server 150. For example, other applications 134 may include security applications for implementing server-side security features, programmatic client applications for interfacing with appropriate application programming interfaces (APIs)

over network 150, or other types of applications. Other applications 134 may contain software programs, executable by a processor, including a graphical user interface (GUI), configured to provide an interface to the user when accessing payment provider server 134. In various embodiments where not provided by transaction processing application 132, other applications 134 may include connection and/or communication applications, which may be utilized to transmit communications to one or more devices.

Additionally, service provider server 130 includes database 136. Accounts in database 136 may include entity information, such as name, address, birthdate, payment/funding information, additional user financial information, and/or other desired user data. The entity may link to their respective accounts through an account, user, merchant, and/or device ID, as well as a generated token, which may be provided to second user device 120 for use. Thus, when an ID is transmitted to service provider server 130, e.g., from first user device 110, an account belonging to the entity may be found. Database 136 may also include authentication and identity requirements, as well as identity confirmation messages and responses for processing to provide access requested by one or more devices.

In various embodiments, service provider server 130 includes at least one network interface component 138 adapted to communicate with first user device 110 and/or second user device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
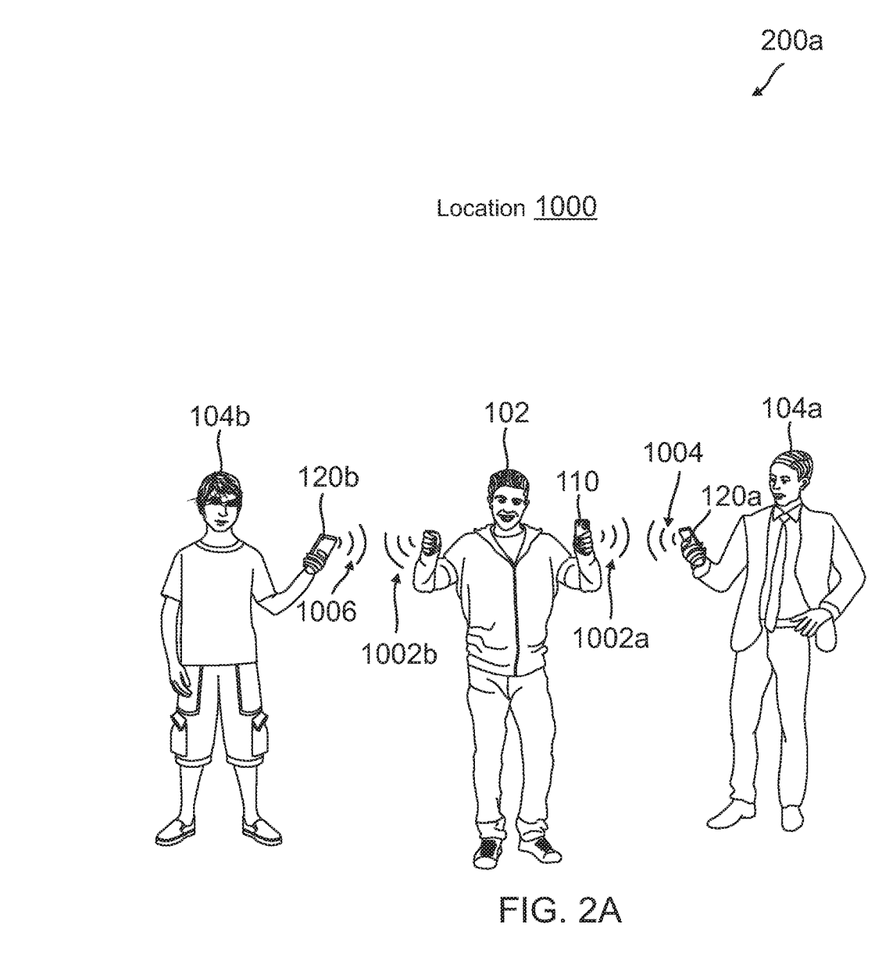
FIG. 2A is an exemplary real-world environment where a device may utilize short range wireless communications to confirm identity of a user during authentication processing, according to an embodiment.

FIG. 2A is an exemplary real-world environment where a device may utilize short range wireless communications to confirm identity of a user during authentication processing, according to an embodiment. In environment 200a, a user 102 may utilize first user device 110 discussed in reference to system 100 of FIG. 2A. Similarly, a user 104a utilizes a user device 120a and a user 104b utilizes a user device 120b, where user device 120a and user device 120b both correspond generally to second user device 120 discussed in reference to system 100 of FIG. 1.

Environment 200a may correspond to a location 1000 where users 102, 104a, and 104b may be co-located and user 102 may require use of first user device 110 to perform some process and access some resource. For example, location 1000 may correspond to a merchant location where user 102 attempts to pay for a transaction with a merchant device using first user device 110 (e.g., through electronic transaction processing using an online service provider, account, and/or payment information). In order to proceed with the requested process, user 102 may utilize first user device 110 to request access and/or processing. This may require identity confirmation that user 102 is an authorized user for the access and/or processing requested through first user device 110. For example, an authentication request may be provided on first user device 110 to authenticate user 102 as the valid user, where the authentication request further uses user devices 104a-b to validate the identity of user 102 as the valid user.

In this regard, at location 1000, first user device 110 determines that an identity confirmation process is required and uses signaling 1002a to communicate with user device 120a and signaling 1002b to communicate with user device 120b through short range wireless communications. Signaling 1002a-b may be performed through Bluetooth or other device-to-device communication protocol, and may further allow for first user device 110 to scan for the presence of user devices 120a-b in proximity to first user device 110 and ping those devices for a response to detect their presence. User device 120a may respond to first user device 110 through signaling 1004 to notify first user device 110 that user device 120a is within a wireless communication proximity range. Similarly, user device 120b may respond to first user device 110 through signaling 1006. Once first user device 110 determines that user devices 120a-b are close enough to communicate with through a short range wireless connection, first user device 110 may prepare a message for user devices 120a-b that may request users 104a-b to respond to the message.

The message may correspond to a request to confirm that the authorized user for the process, account, device, or other requested access and/or processing is actually user 102. The message may be transmitted or pushed from first user device 110 to user devices 120a-b through signaling 1002a-b, respectively. The message may then populate on an interface of user devices 120a-b. Thus, users 104a-b may be requested to confirm that they can view the authorized user at location 1000. If the authorized user is different than user 102, then users 104a-b may deny that they are able to confirm the presence of the authorized user at location 1000 and requesting the access/processing through first user device 110. This may cause first user device 110 and/or a service provider to deny authenticating the user and providing the access/processing. However, if users 104a-b respond in the affirmative and can confirm that user 102 is the authorized user and is seen at location 1000, the requested access/processing may be authenticated and confirmed, and user device 110 may proceed with processing. The response data may be transmitted by user devices 120a-b to first user device 110 through signaling 1004 and 1006, respectively.

The message may further request that user 104a-b capture an image of the authorized user for the requested access and/or processing, which may correspond to capturing an image of user 102. Facial recognition may be performed on the image to determine if user 102 in the image(s) matches a stored image of the authorized user, which may be stored by first user device 110 and/or a service provider. Additionally, user 102 is confirmed as the authorized user, the user image for the requested access/processing may be updated based on the captured image for use in future facial recognition. In some embodiments, user devices 120a-b may be pointed at user 102 based on a command to identify user 102 and point user devices 120a-b at user 102 or when capturing an image of user 102 for identity confirmation. Using data of the direction, angle, or other location measurement, triangulation may be performed to locate where user devices 120a-b are pointing. This may provide a triangulated location where the device directions converge. Using this location, a geo-location of first user device 110 at a current time or time of the requested access/processing may be determined, and may be matched to the triangulated position to further verify that user 102 is at location 1000 and using first user device 110 (e.g., another user at location 1000 has not misappropriated first user device 110 and is attempting to use first user device 110 fraudulently).

Figure 2B:
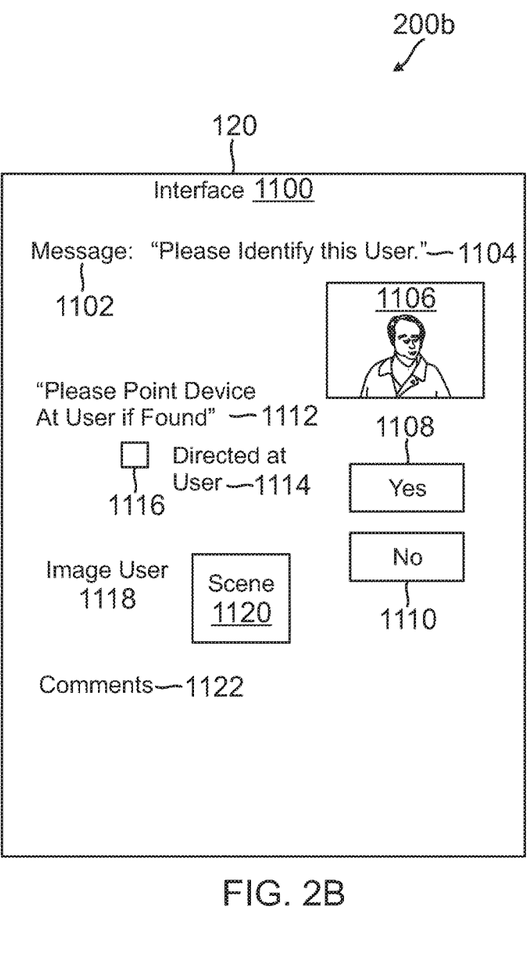
FIG. 2B is an exemplary communication device interface displaying an identity confirmation request during authentication processing, according to an embodiment.

FIG. 2B is an exemplary communication device interface displaying an identity confirmation request during authentication processing, according to an embodiment. Environment 200b includes second user device 120 as discussed in reference to system 100 of FIG. 1. In this regard, second user device 120 displays an interface 1100, such as a user interface that may be displayed by identity confirmation application 122 is system 100.

Interface 1100 may be used to display an identity confirmation message to a second user using second user device 120 in order to confirm an identity of a first user using a first device, such as first user device 110 in system 100 and environment 200a. Interface 1100 may be displayed based on the message being transmitted to second user device 120 from the first user device and/or a service provider performing the authentication of the user's identity. Thus, interface 1100 may display a message 1102 to the second user using second user device 120, which may include message content 1104 stating "Please identify [this user]." Message content 1104 may be used to alert the second user of an action to take, and may be displayed with an image 1106 of the second user. Image 1106 may assist the second user in determining whether the authorized user requesting the access/processing on the first device nearby second user device 120 is actually using the first device. In the second user can identify the first user nearby the second user, the second user may confirm that the first user is present using identity confirmation 1108. However, if the first user is not present, an identity denial 1110 may be provided, which may indicate that the first device is potentially being used fraudulently and additional security mechanism should be instituted.

In addition to presenting image 1106 for confirmation of the user's identity, additional mechanisms may be provided with message 1102 and second user device 120 to further confirm that the first user is present nearby second user device 120. For example, a directional request 1112 may be displayed that asks the second user to point second user device 120 at the first user if visible from image 1106. The second user may confirm instructions 1114 using option 1116 when second user device 120 is pointed at the user. In response, second user device 120 may capture directional data of second user device 120 so that triangulation of a position of the first user may be determined and matched to a geo-location of the first user device. The second user may also be requested to image the user 1118 through a viewfinder displayed with message 1102, such as a scene 1120. This may be used for image matching and/or facial recognition to confirm the presence of the first user. Additionally, the second user may enter one or more comments to comments field 1122, such as an indication of whether the first user is acting suspiciously or under duress and additional security precautions should be instituted.

Figure 3:
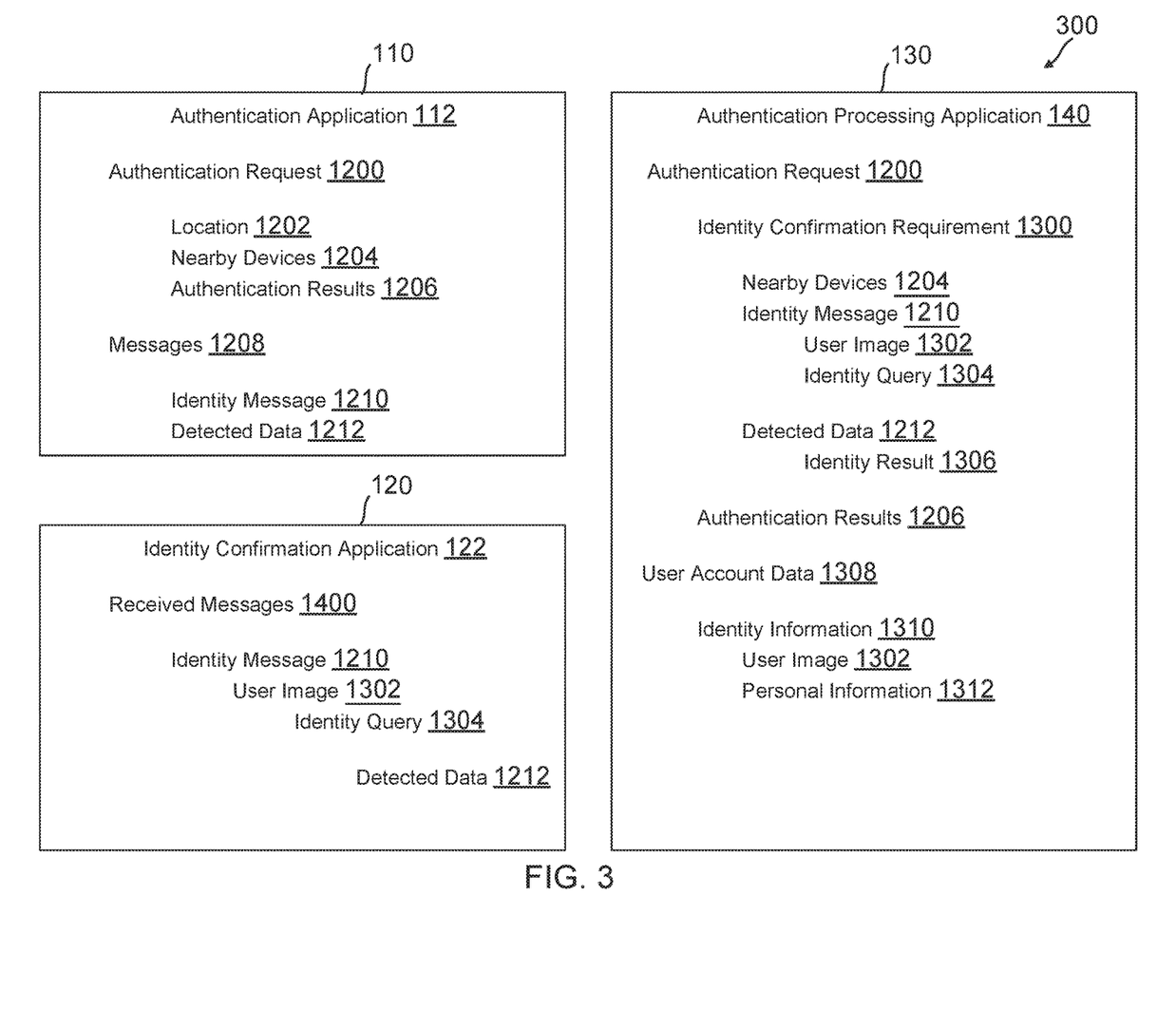
FIG. 3 is an exemplary system environment for communication device and server provider processes to confirm a user identity during authentication processing, according to an embodiment.

FIG. 3 is an exemplary system environment for communication device and server provider processes to generate a network cache and digital ledger to complete electronic transaction processing in the event of device failure, according to an embodiment. Environment 300 of FIG. 3 includes a first user device 110, a second user device 120, and a service provider server 130 corresponding generally to the described devices and associated features found in system 100 of FIG. 1.

In environment 300, first user device 110, second communication device 110, and service provider server may execute modules and processes described in reference to FIG. 1. In this regard, first user device 110 may initially execute authentication application 112 to enter an authentication request 1200 in order to receive some access or perform some process. Authentication request 1200 may be associated with a location 1202 where authentication request 1200 is entered and processing is requested. Using location 1202 and/or a scan of nearby devices through short range wireless communications, nearby devices 1204 may be determined. Additionally, authentication request 1200 may be associated with an authentication result 1206 that is determined or provided to authentication application 112 based on actions and data processed by second user device 110 and service provider server 130. For example, messages 1208 may include an identity message 1210 for transmission to second user device 120, which may be responded to with detected data 1212 by second user device 120.

Service provider server 130 executes authentication processing application 140 to process authentication request 1200 and determine that authentication request 1200 requires an authentication confirmation requirement 1300. Nearby devices 1204 may be detected for identity confirmation requirement 1300, and identity message 1210 may be generated by authentication processing application 140 having user image 1302 from user account data 1308 and an identity query 1304 to assist in determining an identity of a user using first user device 110. Thus, authentication processing application 140 may access user account data 1308 to determine identity information 1310 for identity message 1210, where identity information may include both user image 1302 and additional personal information 1312 for the user. However, in some embodiments, first user device 110 may provide one or more of the processes discussed in reference to service provider server 130 independently, for example, to verify a user identity using first user device 110.

Identity message 1210 may be transmitted to second user device 120, and received messages 1400 by second user device 120 may include identity message 1210 having user image 1392 and identity query 1304. This may be received by second user device 120 over short range wireless communications with first user device 110 or network communications with service provider server 130. In response to identity message 1210, detected data 1212 may be determined by second user device 1212 and sent back to one or more of first user device 110 over the wireless connection or service provider server 130 over the network connection. Detected data 1212 may be processed to determine an identity result 1306 based on whether the authorized use of user account data 1308 can be identified as using first user device 110. Thus, authentication results 1206 may be determined and provided to first user device 110 to respond to authentication request 1200.

Figure 4:
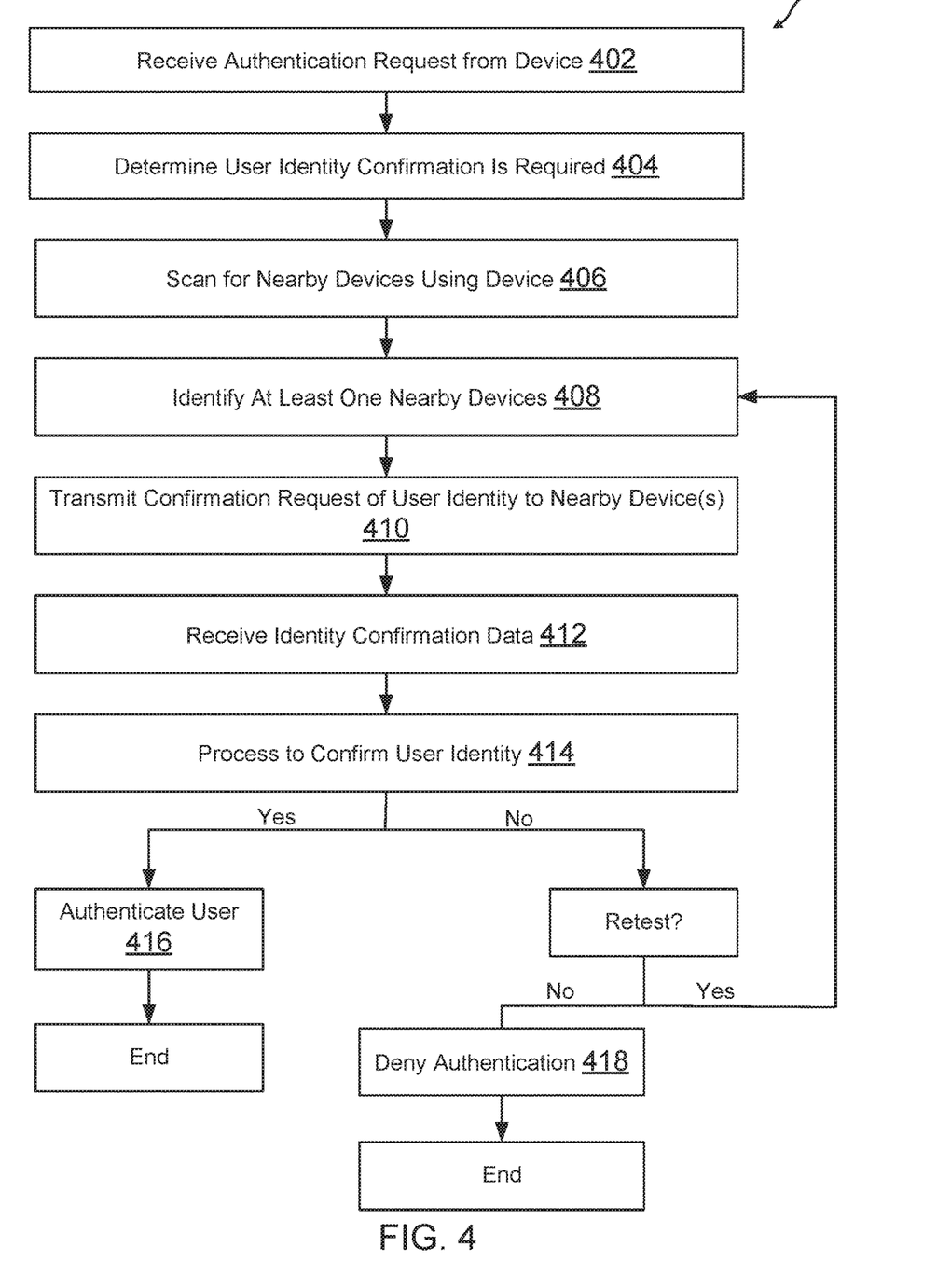
FIG. 4 is an exemplary process flowchart for identity confirmation during authentication requests using nearby devices, according to an embodiment.

FIG. 4 is an exemplary process flowchart for a network cache of device input for redundancy during device inoperability, according to an embodiment. Note that one or more steps, processes, and methods described herein may be omitted, performed in a different sequence, or combined as desired or appropriate.

At step 402 of flowchart 400, an authentication request is received from a device, such as a request to access some device operation, application, and/or an online account with a service provider. The authentication request may also correspond to a request to perform some processing in an application, such as an electronic transaction processing request through a payment application and using an online payment provider platform. In response to the request, it is determined that a user identity is required to be confirmed, at step 404. This may be due to a new or unlikely place, time, or amount/transaction data associated with the authentication request. For example, if the user is purchasing an abnormally large transaction or at a new location, the transaction may be flagged as suspicious and identity may be required to be confirmed. In other embodiments, the confirmation may be set by the service provider and/or user.

At step 406, a scan for nearby devices is executed. The scan may be through short range wireless communications and signaling by the device receiving the authentication request, or may be performed through geo-location matching of the device to other nearby devices. The nearby device may be detected as within a close enough proximity to provide viewing of a user using the first device receiving the authentication request. Additionally, a service provider may also determine the nearby devices based on prior authentications and/or verifications performed by the nearby devices, which may be with the device and the user of the device. For example, one or more of the nearby devices may previously have authenticated the user's identity and may therefore be selected. The service provider may provide a user interface on the device that displays the eligible verification users and allows the user of the device to select one or more of the eligible verification users for transmission of a verification message of the user's identity. This allows the user of the device to designate trusted users to receive the verification message and prevents unknown parties from receiving user information of the user.

Thus, at least one nearby device is identified, at step 408, which allows for a user of the nearby device(s) to view the first device and/or user using the first device. This allows those nearby users to confirm an identity of the user using the first device or notify the first device and/or a service provider that an unknown user is using the device in a potentially fraudulent manner. In some embodiments, the at least one nearby device may be selected by the user of the device requiring identity confirmation, for example, through a display of a plurality of nearby devices on an interface of the device requiring the identity confirmation. Thus, a list of nearby devices may be presented to the user to allow the user to designate another user and/or device for the identity confirmation. A confirmation request of the user's identity is generated and transmitted to the nearby device(s), at step 410, which requests that the nearby user(s) determine whether they can see the user using the first device, capture an image of that user, and/or point the device at the user to provide data that may be processed to determine whether the authorized user's identity can be verified and authentication provided to access or process data.

Identity confirmation data is received at step 412, which may include a user response to the identity confirmation request, a captured image, and/or device directional data. This may be received by the first device and/or by a service provider server for processing, and the user identity is attempted to be confirmed, at step 414, using the received data. If the identity can be confirmed the user may be authenticated for the requested access/processing, at step 416. However, if the user identity cannot be confirmed, such as if the data is insufficient, it may be determined whether a retest is available, such as if the data is insufficient but not clearly of a different user. However, if no retest is available, such as if the data is clearly of a different user, then authentication may be denied at step 418. However, if the retest is available, flowchart 400 may return to step 408 in order to identify other nearby devices and proceed with requesting identity confirmation from those devices.

In various embodiments, the request for nearby devices to identify or confirm the user/user device may be selectively sent. For example, not all nearby devices may be sent a request, such as if a device is determined to be associated with fraudulent transactions, reported stolen or missing, or is otherwise determined to not be trustworthy. Such a determination can be based on device identifiers of the devices or other data obtained about the devices. In some embodiments, the nearby devices that are selected to receive identity confirmation message may be based on previously provided authentication and/or identification information. Scores may be determined and associated with the nearby secondary devices based on the authentication information, which may be used to determine if the nearby devices qualify to receive the identity confirmation message. In some embodiments, a previous identification confirmation performed by the nearby device (including with the device requiring user identity confirmation) may be used to select and/or score the nearby device.

In another embodiment, responses from nearby devices may not be weighed or considered the same. For example, a request may be sent to all nearby devices, even ones who may not be trustworthy, and responses received by some devices that includes ones not necessarily trustworthy. In such cases, the system may ignore responses from devices determined to be less trustworthy or may apply a lower weight to those responses compared to responses from devices that have been associated with a high number of valid transactions. Determining whether a device is trustworthy can be based on a transaction history associated with the device and generating a trustworthiness score based on the transaction history and any other factors the system may use in fraud prevention and other risk mitigation measures. When the trustworthiness score exceeds a certain threshold, which can vary depending on the type of access requested, the device associated with the score can be deemed untrustworthy. The trustworthiness score can also be used to determine a weight to assign responses from specific devices, where low scores can be associated with greater weights and higher scores associated with lower or even zero weight.

Figure 5:
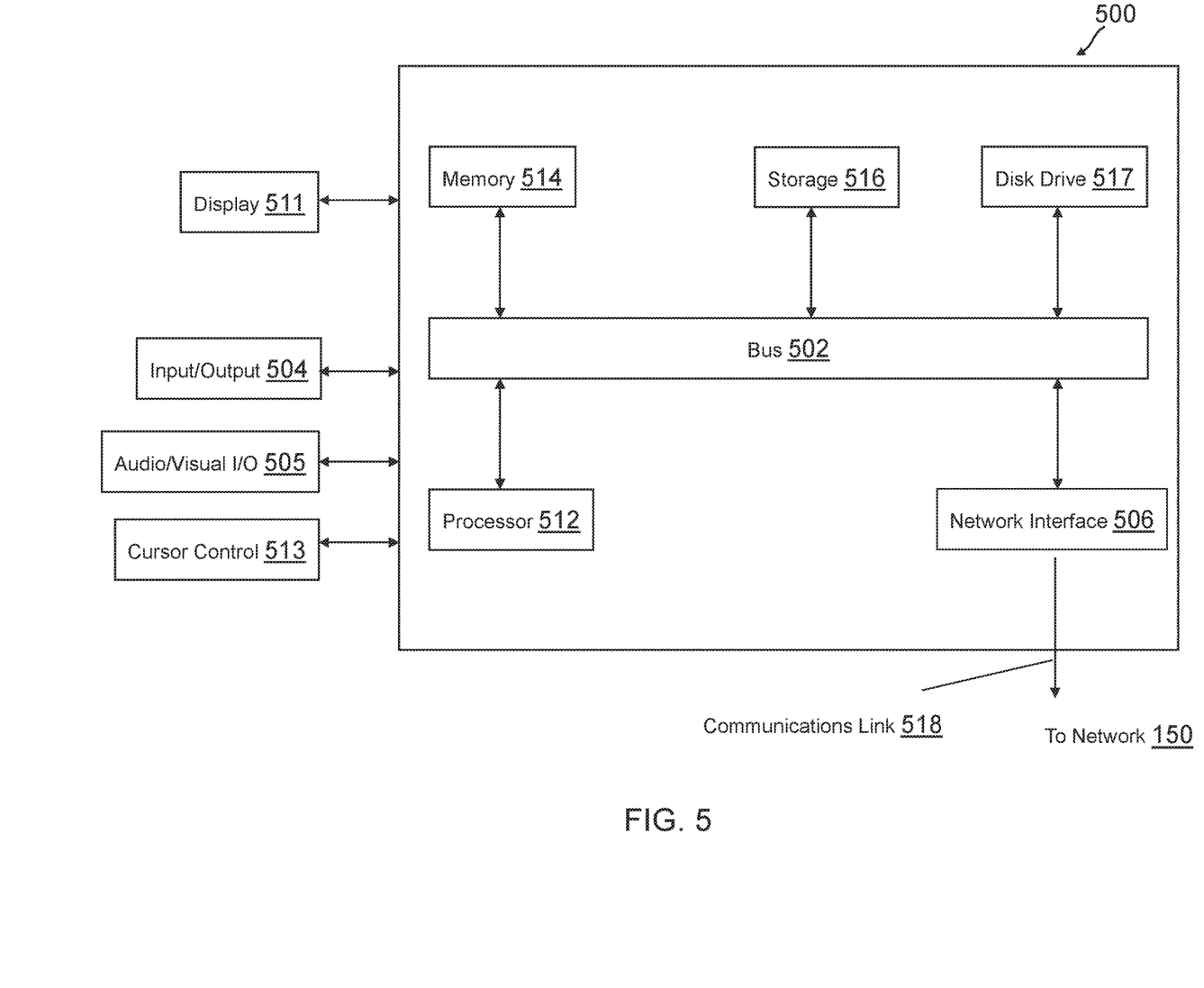
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A first user device comprising:
    a communication module configured to communicate with a second user device using short range wireless communications;
    a non-transitory memory storing instructions; and
    one or more hardware processors coupled to the non-transitory memory and configured to read the instructions from the non-transitory memory to cause the first user device to perform operations comprising:
        receiving an authentication request for an account of a first user in an application on the first user device;
        determining the second user device is within a distance to the first user device using a short range wireless scan of available devices by the communication module;
        generating a confirmation request that the first user is utilizing the first user device, wherein the confirmation request comprises an image of the first user and includes a request to capture a current image of the first user;
        pushing the confirmation request to the second user device through the short range wireless communications by the communication module;
        receiving a response message from the second user device based on the confirmation request, wherein the response message comprises the current image;
        performing facial recognition of the first user in the current image based on the image; and
        authenticating use of the account in the application based on the facial recognition.

2. The first user device of claim 1, wherein the short range wireless communications comprise one of near field communications, radio communications, infrared communications, Bluetooth communications, Bluetooth Low Energy (BLE) communications, WiFi communications, or LTE Direct communications.

3. The first user device of claim 1, wherein the confirmation request comprises a request to identify that the first user is in possession of the first user device at a time associated with the authentication request.

4. The first user device of claim 1, wherein the authentication request comprises one of an account login at a new location for the first user device, a password reset for the account, or an electronic transaction processing in the application using the account.

5. The first user device of claim 1, wherein the second user device comprises one of a plurality of user devices detected within the distance to the first user device using the short range wireless scan of the available devices, and wherein the confirmation request is pushed to each of the plurality of user devices.

6. The first user device of claim 5, wherein the confirmation request further comprises a request to point the each of the plurality of user devices at the first user, and wherein the operations further comprise:
- receiving triangulation information from the plurality of user devices;
- determining a triangulated position of the first user based on the triangulation information and device triangulation; and
- determining if the triangulated position matches a geolocation of the first user device.

7. The first user device of claim 1, wherein the authenticating the user comprise:
- providing access to the account with a service provider server based on the authenticating.

8. The first user device of claim 1, wherein the operations further comprise:
- processing the authentication request using at least one of image matching of an image captured by the second user device in the response message, a confirmation response in the response message, or directional information of the second user device in the response message.

9. The first user device of claim 1, wherein the operations further comprise:
- determining that the authentication request is performed at a new location for the first user device,
- wherein the confirmation request is generated based on the determining that the authentication request is performed at the new location.

10. A method comprising:
- receiving, by a service provider server, a content access request for an account of a user from a first mobile device;
- determining a second mobile device within a short range wireless communication range of the first mobile device;
- transmitting a user identification message to the second mobile device, wherein the user identification message requests that the second mobile device confirm that the user for the account is present with the first mobile device, wherein the user identification message comprises an image of the user and includes a request to capture a current image of the user;
- receiving a response to the user identification message from the second mobile device, wherein the response comprises the current image; and
- processing the content access request based on the response, wherein the processing comprises:
  - performing facial recognition of the user in the current image based on the image; and
  - authenticating the content access request based on the facial recognition.

11. The method of claim 10, further comprising:
- determining a third user device is within the short range wireless communication range; and
- determining the third user device is not a trusted device, wherein the user identification message is not sent to the third user device.

12. The method of claim 10, wherein the determining the second mobile device is within the short range wireless communication range comprises one of detecting that a geo-location of the second mobile device is within a geofenced area around the first mobile device or scanning for the second mobile device using a Bluetooth scan of available mobile devices by the first mobile device.

13. The method of claim 10, wherein the transmitting the user identification message to the second mobile device is performed through one of network communications between the service provider server and the second mobile device or short range wireless communications between the first mobile device and the second mobile device.

14. The method of claim 10, wherein the authenticating confirms that the user is present with the first mobile device during the content access request, and wherein the method further comprises:
- providing access to the content through an application on the first mobile device.

15. The method of claim 10, wherein the user identification message further comprises a request to at least one of point the second mobile device at the user or confirm that the user is present based on the image.

16. The method of claim 10, further comprising:
- determining a third mobile device is within the short range wireless communication range;
- transmitting the user identification message to the third mobile device, wherein the user identification message requests that the third mobile device confirm that the user for the account is present with the first mobile device;
- receiving a response to the user identification message from the third mobile device;
- determining the third mobile device has a different trustworthiness score than the second mobile device; and
- weighing the response from the third mobile device differently than the second from the second mobile device.

17. A non-transitory machine-readable medium having stored thereon machine-readable instructions executable to cause a machine to perform operations comprising:
- receiving an access request from a first device;
- determining a plurality of devices that are within a wireless communication range of the first device based on previous authentications performed by the plurality of devices;
- causing to be displayed, on an interface of the first device, a list comprising the plurality of devices;
- receiving a selection of a second device from the list on the interface;
- communicating, to the second device, an identification request of a first user in proximity to the first device, wherein the identification request comprises a user image of the first user and a request to capture a current image of the first user;
- receiving a response to the identification request from the second device, wherein the response comprises the current image; and
- processing the access request based on the response, wherein the processing comprises:
  - performing facial recognition of the first user in the current image based on the user image; and
  - authenticating the access request based on the facial recognition.

18. The non-transitory machine-readable medium of claim 17, wherein the determining the plurality of devices comprises:
- accessing a contact list associated with the first device; and identifying the plurality of devices within the wireless communication range of the first device based on the contact list.

19. The non-transitory machine-readable medium of claim 18, wherein the determining the plurality of devices comprises:
accessing a social connection between the first device and the plurality of devices based on a device interaction between the first device and the plurality of devices; and
identifying the plurality of devices within the wireless communication range of the first device based on the contact list and the social connection.

20. The non-transitory machine-readable medium of claim 17, wherein prior to communicating the identification request, the operations further comprise:
determining an account of the user based on the access request; and
accessing the user image from the account.

* * * * *